E. WATKINS.
SCREW CLAMP.
APPLICATION FILED FEB. 26, 1919.

1,328,862.

Patented Jan. 27, 1920.

Inventor
Evan Watkins

By John A. Brumhardt
Atty.

UNITED STATES PATENT OFFICE.

EVAN WATKINS, OF CLEVELAND, OHIO, ASSIGNOR TO THE COLUMBIAN HARDWARE COMPANY, OF CLEVELAND, OHIO, A CORPORATION OF OHIO.

SCREW-CLAMP.

1,328,862.

Specification of Letters Patent. Patented Jan. 27, 1920.

Application filed February 26, 1919. Serial No. 279,282.

*To all whom it may concern:*

Be it known that I, EVAN WATKINS, a citizen of the United States, residing at Cleveland, in the county of Cuyahoga and State of Ohio, have invented certain new and useful Improvements in Screw-Clamps, of which the following is a specification.

This invention relates to clamps, and particularly to screw clamps of the U-bar type, although it is applicable to clamps of other types, vises and other tools.

An ordinary screw clamp is provided with a screw which is advanced by hand to clamp the work, and in small portable clamps the strain often causes the screw slightly to buckle, bend or otherwise become distorted. Due to this and to slight inaccuracies occasioned by wear or manufacturing methods, the free end of the screw will have a rotary movement or play of sufficient amplitude to cause a slight relative displacement between the two or more clamped members as pressure is applied thereto. This creeping movement is well known to many users of the ordinary type of screw clamp and previously it has been deemed impracticable to remedy the same. The object of the present invention is to avoid this, and it is accomplished by the use of a bushing, which is threaded to receive the screw and is mounted to be turned in the frame of the clamp so that after the screw is turned down against the work, additional pressure can be applied thereto by turning the bushing in the reverse direction, which acts to advance the screw without any twisting or bending strain, the rotation of the bushing being effected by a finger piece or wing nut applied thereto.

The invention is illustrated in the accompanying drawings, in which—

Figure 1:
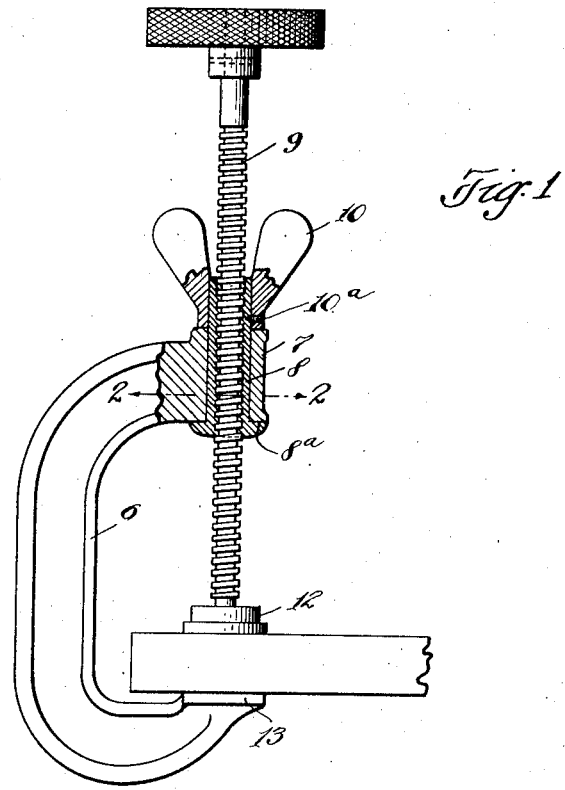
Figure 1 is a side elevation of the clamp, partly in section.
Figure 2:
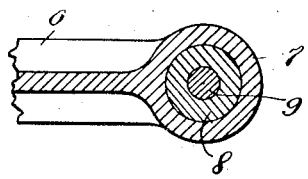
Fig. 2 is a section on the line 2—2 of Fig. 1.

The U-frame of the clamp is indicated at 6, and carries the usual fixed jaw 13. The movable jaw is indicated at 12 and is mounted at the inner end of the screw 9, the outer end of which is provided with a knurled head by which it may be turned, this screw is threaded through a bushing 8, which is rotatably mounted in the sleeve 7 of the frame, and is prevented from longitudinal movement by a shoulder $8^a$ at its inner end a wing nut which is fixed upon its outer end by a set screw $10^a$. The bushing may be turned with respect to the screw by means of the wing nut, and also turns freely in the sleeve 7. The screw, meantime, will be withheld from turning and thus its free end may be advanced in direct line with the fixed jaw, to place the necessary pressure upon the interposed work, without possibility of causing any creeping action whatever.

In the use of the device the screw is advanced by turning the same until the work is clamped between the jaws. Then the screw may be further advanced and securely tightened by turning the bushing 8 in the reverse direction, the screw at the same time being held against rotation. This tightens the screw by direct thrust thereon, avoiding any bending or twisting strain, and preventing the resulting distortion which has hitherto made ordinary screw clamps unserviceable. The interiorly tapped bushing 8, it will be observed, acts directly upon the thread of the screw, being readily rotated independently thereof by the wings 10 secured at the outer end of the bushing. An ordinary screw 9 alone is required in conjunction with the bushing; the latter being tapped instead of one of the jaws, to accommodate the screw, whereby a very cheap and simple construction is obtained. This creeping action would not be prevented by a ball and socket joint, for example, between the screw and the jaw 12, because the creeping action referred to is not due to rotation of the jaw on its own axis but to the revolution of the lower end of a worn or distorted screw around the axis of the screw. By means of this invention the jaw 12 does not have to be guided, but as the screw is advanced in a direct line the jaw will also clamp in a direct line, without any tendency to creep around.

The invention is capable of modification within its scope, and also of application to other types of clamping instruments, as referred to above.

I claim:

1. A clamp comprising a U-frame having a fixed jaw at one extremity, a rotatable tapped bushing mounted at the opposite extremity of said frame, a clamping screw rotatable within the bushing positioned with its free end adapted to be actuated toward and away from the fixed jaw, and means for independently actuating the screw and bushing, substantially as set forth.

2. A clamp comprising a U-frame, a rotatable tapped bushing mounted in one extremity of said frame, a thumb-piece securing said bushing in position and adapted to turn it within the frame, a clamping screw rotatable within said bushing in opposition to the other extremity of the U-frame, and a clamping jaw carried by the free end of the screw and guided solely thereby.

In testimony whereof, I do affix my signature in presence of two witnesses.

EVAN WATKINS.

Witnesses:
ROBERT L. BRUCK,
JOHN A. BOMMHARDT.